(12) United States Patent
Strange

(10) Patent No.: US 12,233,371 B2
(45) Date of Patent: Feb. 25, 2025

(54) PASSIVE INLINE ANNULAR PHASE SEPARATOR

(71) Applicant: Hamilton Sundstrand Corporation, Charlotte, NC (US)

(72) Inventor: Jeremy M. Strange, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 466 days.

(21) Appl. No.: 17/574,089

(22) Filed: Jan. 12, 2022

(65) Prior Publication Data

US 2023/0219025 A1    Jul. 13, 2023

(51) Int. Cl.
*B01D 46/00*  (2022.01)
*B01D 46/10*  (2006.01)
*B64G 1/48*  (2006.01)

(52) U.S. Cl.
CPC ..... *B01D 46/0031* (2013.01); *B01D 46/0001* (2013.01); *B01D 46/10* (2013.01); *B64G 1/48* (2013.01); *B01D 2265/06* (2013.01)

(58) Field of Classification Search
CPC .......... B01D 46/0031; B01D 46/0001; B01D 46/10; B01D 2265/06; B01D 46/003; B64G 1/48; F24F 2003/1435; F24F 2003/144; F24F 3/14
USPC ....................................................... 55/307
See application file for complete search history.

(56) References Cited

U.S. PATENT DOCUMENTS

| | | |
|---|---|---|
| 6,610,122 B1 | 8/2003 | Filburn et al. |
| 6,708,517 B1 | 3/2004 | Piao et al. |
| 8,137,436 B2 | 3/2012 | Calis et al. |
| 2012/0255375 A1* | 10/2012 | Kwok ...................... G01N 1/40 73/863.22 |
| 2014/0059985 A1 | 3/2014 | Janakiraman et al. |
| 2016/0177890 A1 | 6/2016 | Kobayashi et al. |
| 2020/0316519 A1* | 10/2020 | Pess .......................... C02F 9/00 |
| 2021/0198872 A1* | 7/2021 | Colman ............... B01D 5/0042 |

FOREIGN PATENT DOCUMENTS

| | | | |
|---|---|---|---|
| CN | 104540570 A | 4/2015 | |
| DE | 102014211124 A1 | 12/2014 | |
| JP | 6094398 B2 * | 3/2017 | ............ B01D 45/08 |
| WO | 9926464 A2 | 6/1999 | |
| WO | 2021222925 A1 | 11/2021 | |

OTHER PUBLICATIONS

Abstract for DE102014211124A1, Published: Dec. 24, 2014, 1 page.
European Search Report for Application No. 23151355.7, mailed May 12, 2023, 7 page.
European Office Action for Application No. 23151355.7, mailed Jun. 26, 2024, 5 pages.

* cited by examiner

*Primary Examiner* — Robert A Hopkins
*Assistant Examiner* — Qianping He
(74) *Attorney, Agent, or Firm* — CANTOR COLBURN LLP

(57) ABSTRACT

A phase separator includes an inlet of an inlet duct to receive two-phase flow from a two-phase flow source that is in line with the inlet duct. The two-phase flow includes gas and liquid. The phase separator also includes a liquid permeable membrane arranged at an outlet of the inlet duct to pass the liquid for capture while diverting the gas to result in an annular flow of the gas around the liquid permeable membrane. An outlet of an outlet duct outputs the gas that is separated from the liquid and that results in the annular flow of the gas.

10 Claims, 3 Drawing Sheets

PASSIVE INLINE ANNULAR PHASE SEPARATOR

BACKGROUND

Exemplary embodiments pertain to the art of flow separation and, in particular, to a passive inline annular phase separator.

Humidity control is part of many systems (e.g., home and auto air conditioning, submarine and space vehicle environment control and life support (ECLS) systems). Dehumidification includes liquid condensation, generally with a heat exchanger, liquid separation, and liquid recovery. Efficient liquid separation and recovery may be particularly important in a space application where resource replenishment is limited.

BRIEF DESCRIPTION

In one embodiment, a phase separator includes an inlet of an inlet duct to receive two-phase flow from a two-phase flow source that is in line with the inlet duct. The two-phase flow includes gas and liquid. The phase separator also includes a liquid permeable membrane arranged at an outlet of the inlet duct to pass the liquid for capture while diverting the gas to result in an annular flow of the gas around the liquid permeable membrane. An outlet of an outlet duct outputs the gas that is separated from the liquid and that results in the annular flow of the gas.

Additionally or alternatively, the two-phase flow source is a condenser in a space application, the gas is air, and the liquid is water.

Additionally or alternatively, the phase separator also includes a membrane frame, wherein the liquid permeable membrane is arranged in a central portion of the membrane frame.

Additionally or alternatively, the phase separator also includes a liquid recovery loop arranged on an opposite side of the membrane frame from the liquid permeable membrane to capture the liquid passed through the liquid permeable membrane.

Additionally or alternatively, the phase separator also includes a backplate separating the liquid recovery loop from an inlet of the outlet duct.

Additionally or alternatively, the phase separator also includes a membrane retainer separating the liquid permeable membrane from an outlet of the inlet duct.

Additionally or alternatively, the backplate is affixed to the membrane retainer through the membrane frame.

Additionally or alternatively, the phase separator also includes openings on an outer portion of the membrane frame, outside the central portion that is adjacent to the liquid permeable membrane.

Additionally or alternatively, the openings are configured and arranged based on a pressure drop in the annular flow of the gas.

Additionally or alternatively, the phase separator is passive and the two-phase flow is powered only by a fan in the two-phase flow source.

In another embodiment, a method of assembling a phase separator includes arranging an inlet of an inlet duct to receive two-phase flow from a two-phase flow source that is in line with the inlet duct. The two-phase flow includes gas and liquid. The method also includes disposing a liquid permeable membrane at an outlet of the inlet duct to pass the liquid for capture while diverting the gas to result in an annular flow of the gas around the liquid permeable membrane. The method further includes arranging an outlet of an outlet duct to output the gas that is separated from the liquid and that results in the annular flow of the gas.

Additionally or alternatively, the arranging the inlet includes coupling the inlet duct to a condenser in a space application as the two-phase flow source with the gas being air and the liquid being water.

Additionally or alternatively, the method also includes arranging a membrane frame in a central portion of the membrane frame.

Additionally or alternatively, the method also includes arranging a liquid recovery loop on an opposite side of the membrane frame from the liquid permeable membrane to capture the liquid passed through the liquid permeable membrane.

Additionally or alternatively, the method also includes positioning a backplate to separate the liquid recovery loop from an inlet of the outlet duct.

Additionally or alternatively, the method also includes positioning a membrane retainer to separate the liquid permeable membrane from an outlet of the inlet duct.

Additionally or alternatively, the method also includes affixing the backplate to the membrane retainer through the membrane frame.

Additionally or alternatively, the method also includes arranging openings on an outer portion of the membrane frame, outside the central portion that is adjacent to the liquid permeable membrane.

Additionally or alternatively, the arranging the openings is based on a pressure drop in the annular flow of the gas.

Additionally or alternatively, the phase separator is passive and the two-phase flow is powered only by a fan in the two-phase flow source.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, humidity control may be an important process in many environments. The processes involved in humidity control may be especially important to revitalize water and breathable air in a space environment. Embodiments of the systems and methods detailed herein relate to a passive inline annular phase separator. The phase separator may be in line with a condenser, for example, such that a two-phase (e.g., air and water) flow that is output by the condenser is separated for recovery and reuse of each of the phases. Specifically, the two-phase flow is separated into annular flow with the gas (e.g., air) flowing around the outside of a condensate liquid recover loop that captures the liquid (e.g., water). The arrangement of the phase separator facilitates a passive (i.e., unpowered) configuration. That is, only a fan in the inline source of the two-phase flow (e.g., condenser) drives or powers the two-phase flow.

Figure 1:
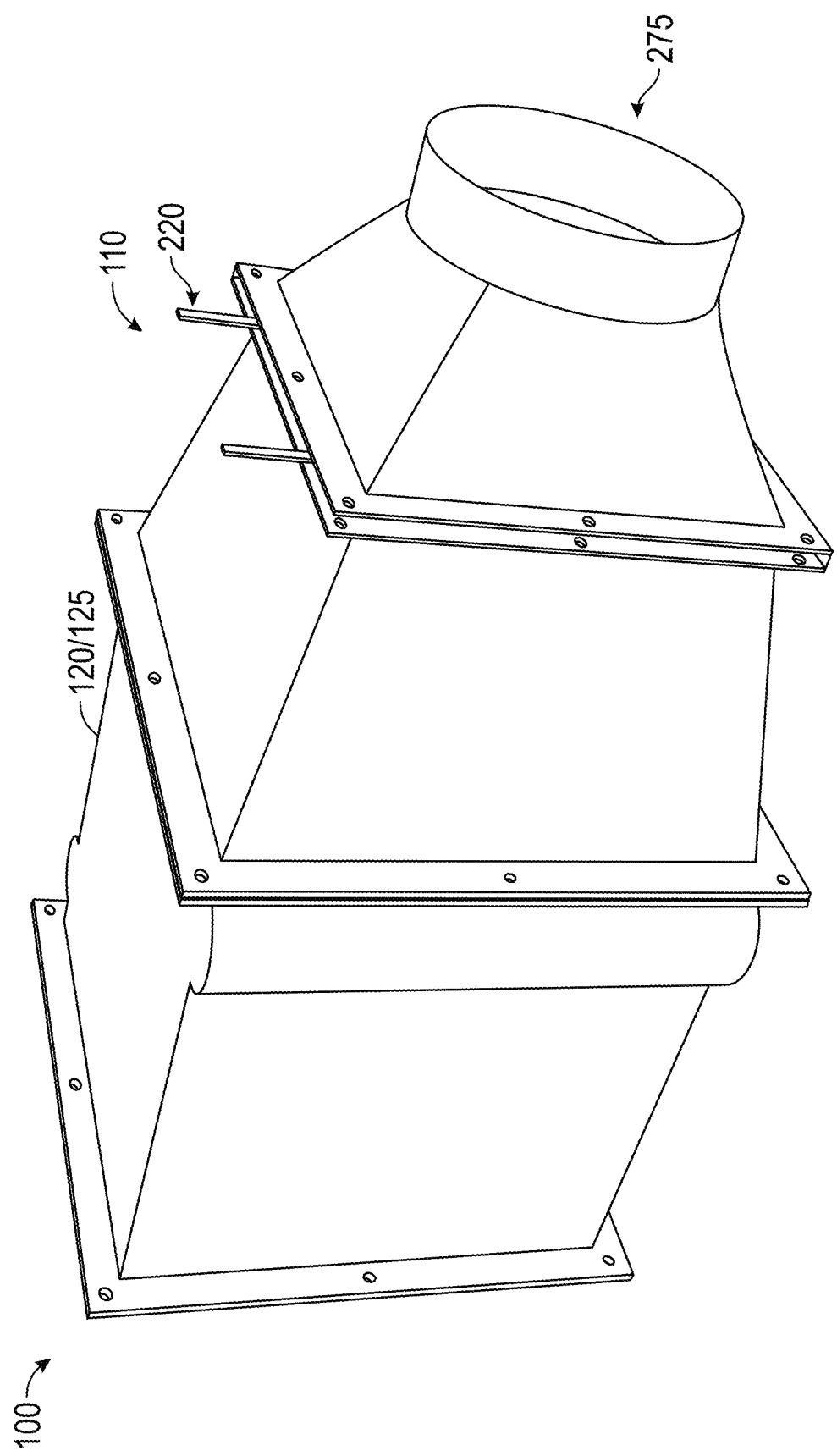
FIG. 1 is an isometric view of a system that includes a passive inline annular phase separator according to one or more embodiments.

FIG. 1 is an isometric view of a system 100 that includes a passive inline annular phase separator 110 according to one or more embodiments. The exemplary inline two-phase flow source 120 is a condenser 125. Portions of the liquid recovery loop 220 that is part of the phase separator 110 are visible in the view of FIG. 1. The gas (e.g., air) that is separated from the two-phase flow that enters the phase separator 110 from the inline two-phase flow source 120 exits from the outlet 275 of the phase separator 110. In a space environment, for example, the gas at the outlet 275 may be air that is recirculated into a habitat or airlock. Further, the liquid recovered via the liquid recovery loop 220 may be water that is captured for reuse.

Figure 2:
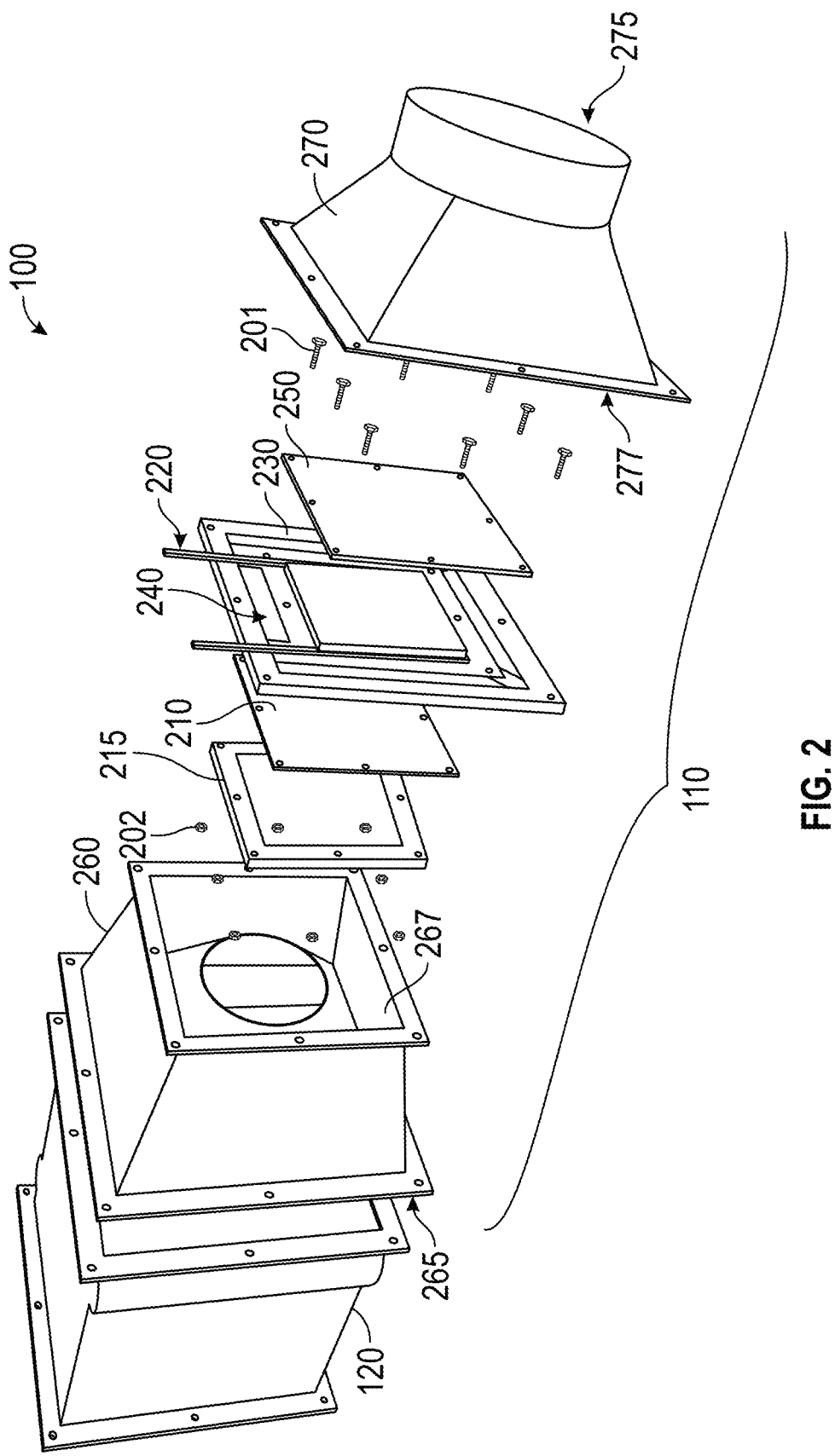
FIG. 2 is an exploded view of the system that includes the phase separator according to one or more embodiments.

FIG. 2 is an exploded view of the system 100 that includes the phase separator 110 according to one or more embodiments. A liquid permeable membrane 210 is permeable to liquid (e.g., water or water-based liquid) and passes the liquid through to a liquid recovery loop 220 for collection. The liquid permeable membrane 210 and liquid recovery loop 220 are sized and arranged on opposite sides within a central portion of a membrane frame 230 such that the openings 240 on the outside portion of the membrane frame 230 are not obstructed. The liquid permeable membrane 210 does not allow flow of the gas and, instead, diverts the gas flow to the openings 240 of the membrane frame 230. Thus, the membrane frame 230 and the arrangement of the liquid permeable membrane 210 at the center of the membrane frame 230 facilitates division of a two-phase flow to annular flow with the gas flowing around the outside.

The two-phase flow enters the phase separator 110 from the inline two-phase flow source 120 via an inlet 265 of an inlet duct 260. A membrane retainer 215 separates the liquid permeable membrane 210 from the inlet duct 260 at an outlet 267 of the inlet duct 260. A solid backplate 250 separates the liquid recovery loop 220 from an inlet 277 of an outlet duct 270. As shown, the backplate 250 is affixed to the member retainer 215 (e.g., via the screws 201 and nuts 202) through the membrane frame 230 to hold together the liquid permeable membrane 210 and the liquid recover loop 220 on either side of the membrane frame 230. The outlet 267 of the inlet duct 260 is affixed to the inlet 277 of the outlet duct 270 such that the components between the member retainer 215 and the backplate 250 are held between the inlet duct 260 and the outlet duct 270.

The backplate 250 is sized according to the size of the liquid permeable membrane 210 and liquid recovery loop 220 such that gas that passes via annular flow through the openings 240 of the membrane frame 230 is not obstructed by the backplate 250 and passes through the outlet 275 of the outlet duct 270. As FIG. 2 indicates, the membrane retainer 215 and the backplate 250 sandwich the liquid permeable membrane 210, membrane frame 230, and liquid recovery loop 220 between the inlet duct 260 and the outlet duct 270.

The exemplary illustration shows the liquid permeable membrane, membrane frame 230, backplate 250 and other components as having generally square shapes. The inlet 265 of the inlet duct 260 must match up with the inline two-phase flow source 120. However, the components of the phase separator 110 from the outlet 267 of the inlet duct 260 to the outlet 275 of the outlet duct 270 may be circular, oval, rectangular, or any other shape. The liquid permeable membrane 210, regardless of its shape, must be sized and matched with the membrane frame 230 to facilitate the openings 240 for the annular flow of gas around the outside of the liquid permeable membrane 210. The size, number, and arrangement of the openings 240 may be selected based on the expected flow rate of gas in order to minimize pressure drop.

Figure 3:
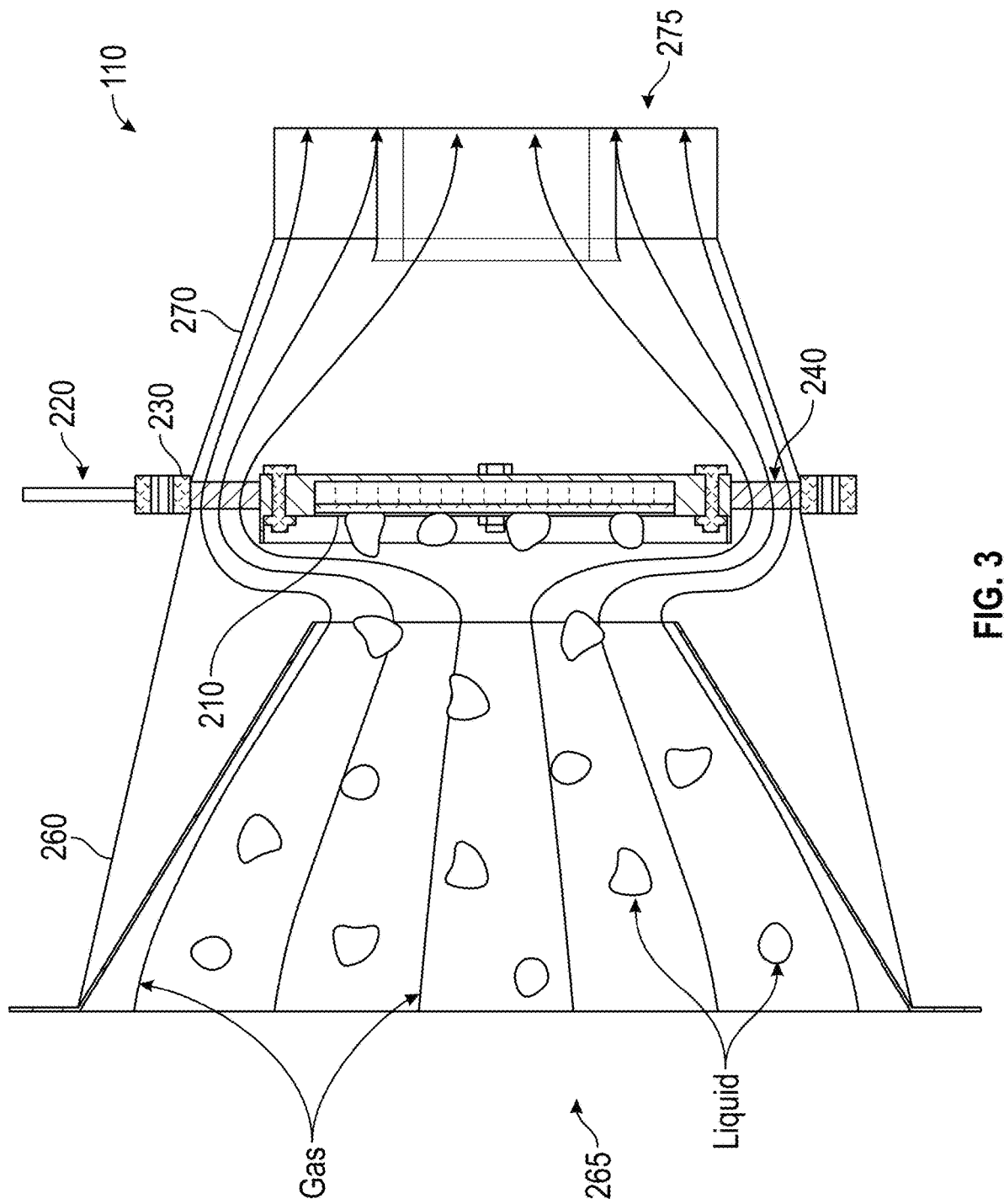
FIG. 3 is a cross-sectional view of the phase separator according to one or more embodiments.

FIG. 3 is a cross-sectional view of the phase separator 110 according to one or more embodiments. As shown, a two-phase flow of gas and liquid (e.g., air and water) enters the phase separator 110 via an inlet 265 of the inlet duct 260. Between the inlet duct 260 and the outlet duct 270, the liquid passes through the liquid permeable membrane 210 to the liquid recovery loop 220, which captures the liquid. The gas, which cannot pass through the liquid permeable membrane 210 instead passes through the openings 240 of the membrane frame 230 that are around the periphery of the membrane frame 230 and outside the liquid permeable membrane 210, as shown. This gas exits the output duct 270 and the phase separator 110 via the outlet 275.

The annular flow path of the gas around the liquid permeable membrane 210 results in a minimal pressure drop. This allows the phase separator 110 to be passive, relying on the momentum of gas flow from the inline two-phase flow source 120 to pull both phases through the phase separator 110. The annular gas flow arrangement and resultant relatively low pressure drop allows passive operation of the phase separator 110 regardless of the orientation of the system 110 (e.g., up and down rather than side to side) and regardless of the environment (e.g., space).

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A phase separator comprising:
   an inlet of an inlet duct, the inlet configured to receive two-phase flow from a two-phase flow source that is in line with the inlet duct, wherein the two-phase flow includes gas and liquid;
   a liquid permeable membrane arranged at an outlet of the inlet duct, the liquid permeable membrane configured to pass the liquid for capture while diverting the gas to result in an annular flow of the gas around the liquid permeable membrane;
   an outlet of an outlet duct configured to output the annular flow of the gas that is separated from the liquid;

a membrane frame, wherein the liquid permeable membrane is arranged in a central portion of the membrane frame;

a liquid recovery loop arranged on an opposite side of the membrane frame from the liquid permeable membrane and configured to capture the liquid passed through the liquid permeable membrane;

a backplate separating the liquid recovery loop from an inlet of the outlet duct; and a membrane retainer separating the liquid permeable membrane from an outlet of the inlet duct, wherein the backplate is affixed to the membrane retainer through the membrane frame.

2. The phase separator according to claim 1, wherein the two-phase flow source is a condenser in a space application, the gas is air, and the liquid is water.

3. The phase separator according to claim 1, further comprising openings on an outer portion of the membrane frame, outside the central portion that is adjacent to the liquid permeable membrane.

4. The phase separator according to claim 3, wherein the openings are configured and arranged based on a pressure drop in the annular flow of the gas.

5. The phase separator according to claim 1, wherein the phase separator is passive and the two-phase flow is powered only by a fan in the two-phase flow source.

6. A method of assembling a phase separator, the method comprising:

arranging an inlet of an inlet duct to receive two-phase flow from a two-phase flow source that is in line with the inlet duct, wherein the two-phase flow includes gas and liquid;

disposing a liquid permeable membrane at an outlet of the inlet duct, the liquid permeable membrane being configured to pass the liquid for capture while diverting the gas to result in an annular flow of the gas around the liquid permeable membrane;

arranging an outlet of an outlet duct to output the annular flow of gas that is separated from the liquid;

arranging a membrane frame, wherein the liquid permeable membrane is arranged in a central portion of the membrane frame;

arranging a liquid recovery loop on an opposite side of the membrane frame from the liquid permeable membrane to capture the liquid passed through the liquid permeable membrane;

positioning a backplate to separate the liquid recovery loop from an inlet of the outlet duct;

positioning a membrane retainer to separate the liquid permeable membrane from an outlet of the inlet duct; and affixing the backplate to the membrane retainer through the membrane frame.

7. The method according to claim 6, wherein the arranging the inlet includes coupling the inlet duct to a condenser in a space application as the two-phase flow source with the gas being air and the liquid being water.

8. The method according to claim 6, further comprising arranging openings on an outer portion of the membrane frame, outside the central portion that is adjacent to the liquid permeable membrane.

9. The method according to claim 8, wherein the arranging the openings is based on a pressure drop in the annular flow of the gas.

10. The method according to claim 6, wherein the phase separator is passive and the two-phase flow is powered only by a fan in the two-phase flow source.

\* \* \* \* \*